United States Patent [19]

Morris

[11] Patent Number: 5,150,170
[45] Date of Patent: Sep. 22, 1992

[54] OPTICAL PHASE CONJUGATE VELOCIMETER AND TRACKER

[75] Inventor: David J. Morris, Kent, Wash.

[73] Assignee: The Boeing Company, Seattle, Wash.

[21] Appl. No.: 749,874

[22] Filed: Aug. 26, 1991

[51] Int. Cl.⁵ .............................................. G01P 3/36
[52] U.S. Cl. ............................................... 356/28.5
[58] Field of Search ............... 356/28, 28.5, 5, 345, 356/347; 250/201.9

[56] References Cited

U.S. PATENT DOCUMENTS

| | | | |
|---|---|---|---|
| 3,331,651 | 7/1967 | Sterzer | 350/96 |
| 3,422,438 | 1/1969 | Marston | 342/368 |
| 3,506,928 | 4/1970 | Korpel | 372/24 |
| 3,509,488 | 4/1970 | Myers et al. | 372/24 |
| 3,516,013 | 6/1970 | Pole | 372/24 |
| 3,731,103 | 5/1973 | O'Meara | 342/370 X |
| 4,102,572 | 7/1978 | O'Meara | 356/5 |
| 4,148,031 | 4/1979 | Tausworthe et al. | 342/370 |
| 4,166,254 | 8/1979 | Bjokrlund | 372/24 |
| 4,225,870 | 9/1980 | Marner et al. | 342/370 |
| 4,233,571 | 11/1980 | Wang et al. | 372/20 X |
| 4,233,606 | 11/1980 | Chernoff | 342/370 |
| 4,241,351 | 12/1980 | Shreve | 342/368 |
| 4,353,073 | 10/1982 | Brunner et al. | 342/368 |
| 4,429,393 | 1/1984 | Giuliano | 372/20 X |
| 4,472,719 | 9/1984 | Hills | 342/370 X |
| 4,573,157 | 2/1986 | O'Meara | 372/20 X |
| 4,739,334 | 4/1988 | Soref | 342/368 |
| 4,794,605 | 12/1988 | Aprahamian et al. | 372/20 X |
| 4,996,412 | 2/1991 | Anafi et al. | 356/353 |
| 5,006,813 | 4/1991 | Khoshnevisan et al. | 356/5 X |
| 5,018,852 | 5/1991 | Cheng et al. | 356/28.5 |

FOREIGN PATENT DOCUMENTS

WO87/05751 9/1987 PCT Int'l Appl. .

OTHER PUBLICATIONS

Giuliano, Concetto R., "Applications of optical phase conjugation," Physics Today, Apr. 1981, pp. 27–35.
Shkunov, Vladimir V. et al., "Optical Phase Conjugation," pp. 54–59.
"Optical Processing with Photorefractive Semiconductors," NASA Tech Briefs, Physical Sciences, Aug. 1989, p. 37.

Primary Examiner—Mark Hellner
Attorney, Agent, or Firm—Christensen, O'Connor, Johnson & Kindness

[57] ABSTRACT

Apparatus and method for determining velocity and range of a target within a field of view. A velocimeter and tracker (10, 100) includes a laser (12, 12') that produces modulated coherent light, a portion of which illuminates targets (22, 22') coming into a field of view (24, 24') of the velocimeter and tracker. Coherent light reflected from the target travels back along a detection path toward a phase conjugate mirror (40, 40') as a probe wave (26, 26'). A higher intensity portion of the coherent light produced by the laser is split into equal parts that are directed toward the phase conjugate mirror from opposite directions and interact with the probe wave to produce a phase conjugate light signal that travels back along the detection path and is also reflected from the target. Light reflected by the target experiences a Doppler phase shift as a function of target velocity. First, second, and higher order phase shifted signals reflected from the target are imaged on photo diodes (68, 68'), producing an electrical signal having components corresponding to the frequency differences of the various order light signals. As a function of the sums and differences of the frequency components of the electrical signal, the range and velocity of the target are determined.

20 Claims, 5 Drawing Sheets

OPTICAL PHASE CONJUGATE VELOCIMETER AND TRACKER

TECHNICAL FIELD

This invention generally pertains to apparatus and a method for tracking an object using a light signal that is reflected from the object, and more specifically, determining the velocity, range, and position of the target based on time dependent changes in the light reflected from the object.

BACKGROUND OF THE INVENTION

Light waves propagating through an inhomogeneous space are subject to changes caused by interference, refraction, and diffraction. Thus, for example, light waves traveling along a path through a varying density gas and reflected by a mirror back along the same path to their source are likely very different than when initially radiated from the source. However, by replacing the mirror with a device that produces optical phase conjugate light waves, a different result is obtained. The optical phase conjugate light waves returning to the source along the same path are phase reversed, but otherwise are in the same state as the light waves originally emitted by the source. Thus, optical phase conjugation appears to reverse time by "undoing" the changes in the light waves caused by an inhomogeneous medium. An optical phase conjugated light wave therefore compensates for the inhomogeneities or distortion of the intervening space between the source and the device that produces the phase conjugate light waves.

One method of generating phase conjugate light waves employs stimulated Brillouin scattering. High intensity coherent light emitted by a laser is directed at a cell filled with a gas, liquid, or solid. The light causes periodic changes in the density of the material in the cell that also alter the index of refraction of the material in a corresponding periodic pattern. These periodic density fluctuations in the material scatter the light, reflecting a portion of it. The reflected light interferes with the incident wave, causing further density variations in the medium. The cumulative effect of this process continues, eventually creating a "reflected" optical phase conjugate light wave that emerges from the cell in the opposite direction from that traveled by the incident light emitted by the laser. However, the intensity threshold necessary to initiate Brillouin scattering typically requires a source having over a million watts/cm$^2$ intensity. Another disadvantage of this method is that the resulting optical phase conjugate wave is of a slightly different frequency than the source light wave.

Fortunately, optical conjugate light waves can be produced by an alternative method that does not require as powerful a light source. This alternative method is called four-wave mixing because it involves the interference of four light waves inside a non-linear medium. In the prior art, all four light waves are of the same wavelength. One of the four light waves is referred to as a probe wave, i.e., a light wave for which an optical phase conjugate light wave is desired, with a frequency, $\nu_p$. The optical phase conjugate light wave is the second of the four waves, and the other two light waves are called "pump waves". These two pump waves, which are of the same frequency, $\nu_1$ and $\nu_2$, are directed generally from opposite sides into the non-linear medium, which may comprise a dye coating on a glass plate. Interference between the probe and pump waves within the non-linear medium produces the optical phase conjugate light wave, and its frequency, $\nu_c$, is equal to the sum of the two pump wave frequencies less the probe wave frequency, $\nu_c = \nu_1 + \nu_2 - \nu_p$. The optical interaction in the non-linear medium uses energy from the two pump waves in producing the optical phase conjugate light wave, and the preceding equation is an expression of energy conservation in respect to this process. If the pump waves are of the same frequency, $\nu_0$, but differ in frequency from the probe wave by an amount, $\Delta\nu$, the phase conjugate wave frequency is simply: $\nu_c = \nu_0 - \Delta\nu$.

Conservation of momentum is expressed by a similar relation between the wave vectors respectively associated with the four waves. Since the pump waves are at the same frequency, but counterpropagate in opposite directions and therefore cancel, the wave vector of the conjugate wave is $\vec{k}_c = -\vec{k}_p$, where $\vec{k}_p$ is the wave vector of the probe wave, indicating that the phase conjugate wave is equal in magnitude, but travels in precisely the opposite direction of the probe wave.

The present invention is directed at a particular application of the optical phase conjugation phenomena—specifically, tracking the velocity and determining the position and range of one or more targets. Conventional Doppler laser radar ranging devices require a local oscillator and are limited in their ability to resolve the velocity and range of targets closing at extremely high velocities, particularly multiple targets spread over a relatively wide field of view. Such targets can present such large Doppler frequency shifts that their velocities and ranges cannot be accurately determined. In addition, a beam steering mechanism is often required to track the targets in order to keep the receiving device oriented properly to gather the light reflected from the target. Any distortion in the path between a conventional Doppler laser radar site and the target, for example, due to variations in air density, can seriously degrade the modulation efficiency of the received signal.

Accordingly, it is an object of the present invention to provide a velocimeter that can accurately determine the line-of-sight velocity of targets, including those that produce a high Doppler frequency shift in light reflected from the targets. Further, it is an object to resolve the position and range of targets in a wide field of view, even in the presence of intervening atmospheric distortion. A still further object is to provide a self-steering range/velocimeter that can track targets over a relatively wide field of view without use of a beam steering mechanism. These and other objects and advantages of the present invention will be apparent from the attached drawings and the Description of the Preferred Embodiments that follows.

SUMMARY OF THE INVENTION

In accordance with the present invention, apparatus for tracking a light-reflective target to determine its velocity and/or position comprise a source of coherent light having a frequency, $\nu_0$. A portion of the coherent light from the source is directed generally toward the light-reflective target, illuminating it so that it reflects at least some of the coherent light along a detection path as a first order light signal. The frequency of the coherent light comprising the first order light signal is changed by a Doppler shift, $\nu_{ob}$, due to a component of the velocity of the target directed along the detection path. Optical phase conjugate means disposed along the detection path so as to receive the first order light signal produce a first optical phase conjugate wave in respect to the first order light signal. The first optical phase conjugate wave has a frequency that is shifted from $v_0$ by $-v_0 b$ and returns to the light-reflective target in the opposite direction along the detection path. At least a portion of the first optical phase conjugate wave is reflected by the light-reflective target back along the detection path toward the optical phase conjugate means and experiences a total Doppler shift of $-v_0 b^2$ due to the velocity of the target. This portion of the first optical phase conjugate wave is a second order light signal. Imaging means are disposed so as to receive at least a portion of the second order light signal and at least a portion of the first order light signal that is reflected from the light-reflective target and are operative to detect and monitor a spatially dependent intensity of such portions, producing an electrical signal corresponding to a combination of the first and the second order light signals, which is used to determine the position of the light-reflective target. Further, the imaging means monitor the frequency of the electrical signal to determine the component of the velocity of the target directed along the detection path. The position of the light-reflective target is determined by the imaging means in respect to the target's altitude.

The apparatus also comprise splitter means for splitting light emitted from the source of coherent light, producing a first pump wave and a second pump wave, and means for directing the first and second pump waves toward the optical phase conjugate means from generally opposite directions.

Preferably, the imaging means comprise an array of light-sensitive devices, each of which produce a signal corresponding to the intensity of light reflected from the light-reflective target that is incident on the light-sensitive devices.

The phase conjugate means are further operative to produce a second optical phase conjugate wave from the second order light signal. The second optical phase conjugate wave has a frequency, $v_0(1+b^2)$, and travels back toward the light-reflective target along the detection path. At least a portion of the second optical phase conjugate wave is reflected from the light-reflective target and experiences a further Doppler shift. A frequency of the portion of the second optical phase conjugate wave thus reflected is defined by $v_0(1+b+b^2+b^3)$, and this portion comprises a third order optical light signal. At least a portion of the third order light signal and the first order light signal is detected by the imaging means, thereby further defining the velocity of the light-reflective target along the detection path.

If a plurality of light-reflective targets is illuminated by the coherent light from the source, the phase conjugate means are operative to produce a plurality of phase conjugate waves, each corresponding to a different portion of the first order light signal that is reflected from one light-reflective target. The imaging means are further operative to track the velocity and position of each of the plurality of light-reflective targets as a function of the intensity and frequency of the phase conjugate waves reflected from each of the light-reflective targets.

The apparatus can additionally comprise means for focusing portions of the light comprising the first, second, and third order light signals onto an image plane for detection by the imaging means.

Means for periodically modulating a frequency of the coherent light emitted by the source over time enable determination of each target's range. The imaging means respond to the intensities of the first, second, and third order light signals received by the imaging means to produce a signal having a plurality of frequency components, each frequency component corresponding to the difference in optical frequency between a pair of waves that are received by the imaging means. Based on this signal, the imaging means determine the ranges of the light-reflective targets.

Another aspect of the present invention is a method for determining the velocity and/or position of a light-reflective target. The method includes steps that are generally consistent with the functions carried out by the elements comprising the apparatus discussed above.

DESCRIPTION OF THE PREFERRED EMBODIMENTS

Figure 1:
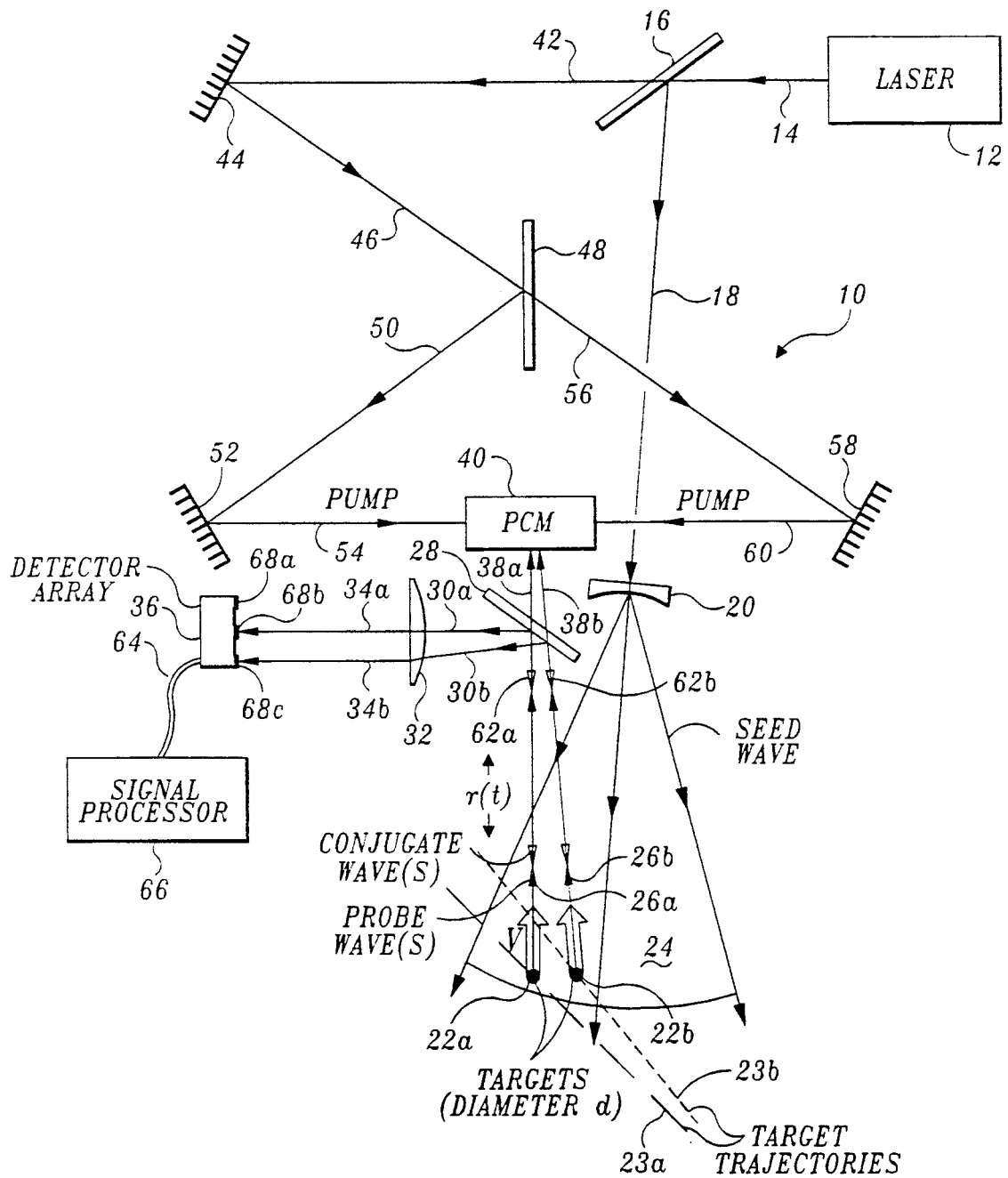
FIG. 1 is a schematic plan view of a first embodiment of an optical phase conjugate velocimeter in accordance with the present invention.

In FIG. 1, a first embodiment of a velocimeter and tracker in accordance with the present invention is schematically represented generally at reference numeral 10. Velocimeter and tracker 10 includes a laser 12, which is a source of coherent light. Preferably, laser 12 comprises a pulsed carbon dioxide ($CO_2$) laser operating, for example, with a wavelength of approximately 10.6 microns. Although the average power of the laser might range from 10 to over 1,000 watts, depending upon the application of velocimeter and tracker 10 and the required usable range for tracking a target, laser 12 should have a relatively high peak output power, e.g., in excess of 1 joule for a 10-microsecond pulse.

The coherent light produced by laser 12 is directed along a path 14 toward a beam splitter 16, which reflects from one to two percent of the coherent light along a path 18. The portion of the coherent light reflected from beam splitter 16 travels along path 18 toward a divergent lens 20, which spreads the coherent light to form a seed wave having a generally conical pattern and a total optical power, P. The conical dispersion of the seed wave thus represents a field of view 24 in which a target can be detected and tracked by velocimeter and tracker 10. Any target entering field of view 24 (within the usable range of velocimeter and tracker 10) reflects a portion of the seed wave, producing a probe wave 26 that propagates back toward velocimeter and tracker 10 along a detection path.

In FIG. 1, a target 22a and a target 22b are shown traveling through field of view 24 along trajectories 23a and 23b. Each target has a component of velocity, V, that is directed along the detection path between that target and velocimeter and tracker 10. The velocity and heading of each target may be substantially different, although they are illustrated as being approximately the same for targets 22a and 22b in FIG. 1. Target 22a reflects a portion of the seed wave, $K_0$, producing a probe wave 26a directed along the detection path toward velocimeter and tracker 10. Similarly, target 22b reflects a portion of the seed wave, $K_0'$, toward velocimeter and tracker 10 along a different detection path, as a probe wave 26b.

A portion, $R_0$ of each probe wave 26 is reflected by a beam splitter 28 along paths 30a or 30b toward a lens 32. Lens 32 forms an image of each target 22a and 22b on a detector array 36. The images of these targets are projected along paths 34a and 34b onto different photodiodes 68 that comprise detector array 36. The portion of each probe wave reflected onto detector array 36 comprises a first order optical signal, and its optical power at detector array 36 is $P_1 = PK_0R_0$ (for target 22a) or $P_1' = PK_0'R_0$ (for target 22b).

The portions of the probe waves 26 that are not reflected by beam splitter 28 are transmitted along paths 38 to a phase conjugate mirror (PCM) 40. The probe waves entering PCM 40 produce corresponding phase conjugate waves, as described below. In the preferred embodiment, PCM 40 comprises a third order non-linear medium, such as germanium. The germanium is preferably in its bulk form. Alternatively, the germanium can be finely ground and suspended in a glass matrix. Other finely ground semiconductors, for example, semiconductors selected from the group of chemical compounds, $CdS_xSe_{1-x}$, could also be used in this application. Critical parameters of the material chosen for the third order non-linear medium and their affect on the operation of the velocimeter and tracker are discussed in greater detail below.

To produce an optical phase conjugate wave, each probe wave 26 is combined in PCM 40 with two pump waves 54 and 60, which enter the phase conjugate mirror from two diametrically opposite directions. Pump waves 54 and 60 are produced from the portion of the coherent light transmitted through beam splitter 16. This transmitted coherent light is relatively intense compared to the portion reflected by beam splitter 16, which forms the seed wave. The transmitted portion is reflected from a mirror 44 along a path 46 that is directed toward a beam splitter 48. Beam splitter 48 divides the intense coherent light equally into a reflected portion, which is directed along a path 50 toward a mirror 52, and a transmitted portion, which is directed along a path 56 toward a mirror 58. Pump wave 54 thus comprises the intense coherent light reflected from mirror 52, and pump wave 60 comprises the intense coherent light reflected from mirror 58.

As explained above in the Background of the Invention, an optical phase conjugate wave is produced when two relatively high intensity, counterpropagating pump beams of coherent light are combined with a probe wave in a third order non-linear medium. The resulting optical phase conjugate wave propagates backwards along the same path followed by the probe wave, seemingly time reversing any distortion to which the probe wave was subject as it propagated over the path toward the phase conjugate mirror.

In velocimeter and tracker 10, probe wave 26a enters PCM 40 with an optical power of $P_{1pcm} = PK_0(1-R_0)$, and is combined with pump waves 54 and 60 to produce a phase conjugate wave 62a. Similarly, probe wave 26b enters PCM 40 and is combined with pump waves 54 and 60 to produce a phase conjugate wave 62b. (The effective "reflectivity" of the phase conjugate mirror is R, which represents the power ratio of each probe wave and its corresponding phase conjugate wave.) Phase conjugate waves 62a and 62b pass through beam splitter 28, traveling in the opposite direction from probe waves 26a and 26b, respectively, due to the time-reverse propagation property of such waves. These phase conjugate waves thus are incident on the targets 22. A fraction, $K_1$, of the light comprising the phase conjugate wave striking target 22a is reflected back toward the velocimeter and tracker. Similarly, target 22b reflects a fraction $K_1'$ of its corresponding phase conjugate wave. The frequency of the reflected light is again Doppler-shifted phase conjugate due to the component of the velocity of each target directed along that target's detection path, i.e., the line-of-sight velocity of each target. The Doppler-shifted phase conjugate light reflected from targets 22a and 22b propagates back toward beam splitter 28 along the corresponding detection path, where a fractional portion, $R_0$, is reflected along paths 30a and 30b, respectively, and through lens 32 to detector array 36. The signal generated in each photodiode 68b and 68c on which this light is incident is a second order signal corresponding to a seed-target-PCM-target-detector propagation sequence, and has an amplitude that is a function of the power of the incident light, e.g., $P_2 = PK_0R_0(1-R_0)^2RK_1$ in respect to photodiode 68b. The portion of the Doppler-shifted phase conjugate wave reflected from targets 22a and 22b that is transmitted through beam splitter 28 and not reflected again enters PCM 40 (with a power $P_{2pcm} = PK_0(1-R_0)^3RK_1$, in respect to light reflected from target 22a), where it is phase-shifted via the frequency inversion property of phase conjugation and again returns to the corresponding target 22a and 22b as a result of the time-reversed propagation property.

A fraction, $K_1$ (or $K_1'$), of this returning phase conjugate light is reflected from the respective targets 22a and 22b, and its frequency is again Doppler-shifted due to the line-of-sight velocity components of the targets in respect to velocimeter and tracker 10. A portion of this re-reflected phase conjugate wave, which is Doppler-shifted for a second time, strikes beam splitter 28, where a fraction, $R_0$, is reflected toward detector array 36, the remainder returning to PCM 40. The reflected portion of this optical signal reaching detector array 36 is a third order signal comprising a seed-target-PCM-target-PCM-target-detector propagation sequence, and it has a power $P_3 = PK_0R_0(1-R_0)^4R^2K_1^2$, in respect to target 22a.

In a similar fashion, fourth and higher order optical signals are produced that are directed toward detector array 36. Each of these higher order optical signals is the result of repetitive phase conjugation of light reflected from the targets entering PCM 40, and the further reflection and Doppler-shifting of the light reflected from the target and subsequently reflected from beam splitter 28 toward detector array 36. Since the fraction of light reflected each time by targets 22, by PCM 40, and by beam splitter 28 is always less than one, each higher order of signal thus produced is significantly weaker by a factor $(1-R_0)^2RK_1$ than the preceding order. However, since only the first three optical orders described above are considered useful in carrying out the determination of velocity (and range) and in tracking each of targets 22 in accordance with the present invention, the relatively low optical power of signals above the third order is of no consequence.

In order for velocimeter and tracker 10 to operate effectively, an aperture of PCM 40 and an aperture of each target 22 must be a mutually unresolvable pair, i.e., $dD < r(t) \lambda$, where d is the width of target 22a or target 22b measured transversely to the corresponding probe wave 26, D is the width of the aperture of the phase conjugate mirror, $\lambda$ is an optical wavelength of the coherent light emitted by laser 12 (corresponding to its basic frequency $\nu_0$), and r(t) is the range from the target to the phase conjugate mirror.

The Detector Array

Detector array 36 includes a plurality of photodiodes 68 distributed in spaced-apart array so as to receive light focused by lens 32. In the schematic illustration shown in FIG. 1, only three photodiodes 68a, 68b, and 68c are separately shown in order to simplify the illustration. Depending upon the resolution with which the targets are to be imaged by detector array 36, a substantially greater number of photodiodes 68 would likely be employed. At a minimum, only a single photodiode 68 is required to determine the range and velocity of a single target 22. However, if only a single photodiode 68 is provided, azimuth and altitude for the target cannot readily be determined. In contrast, use of a 10×10 array of photodiodes 68, for example, enables the azimuth and altitude of each separately resolved target to be determined with an optimum resolution of ten percent of field of view 24. Thus, if the field of view covers 30° in altitude and 30° in azimuth, the position of each separately resolved target can be determined to within 3° for altitude and 3° for azimuth. Even higher density arrays will enable greater resolution of each target's position.

Preferably, photodiodes 68 comprise PIN photodiodes, or avalanche photodiodes having relatively high sensitivity to light, to accommodate the lower optical power of successive order optical signals imaged on detector array 36. Each photodiode 68 produces an electrical signal corresponding to the optical power of the image or portion of the image of each target or closely-spaced targets incident on it. A relatively high electrical signal level from a specific one of photodiodes 68 (compared to the average signal level for all the photodiodes) indicates the image of a target is incident on that photodiode and thus defines the position of that target in field of view 24, since each photodiode 68 in detector array 36 corresponds to a specific subregion in the field of view, i.e., to the range of altitude and azimuth for that subregion.

The electrical signals are supplied through a cable 64 to a signal processor 66. Signal processor 66 preferably comprises a separate spectrum analyzer for each photodiode 68 or other element in detector array 36 that is responsive to optical signals. Alternatively, signal processor 66 can comprise a fast Fourier transform processor that produces a frequency domain representation corresponding to the total optical signal incident on each photodiode 68. The frequency domain representation produced by signal processor 66, either by each of the one or more spectrographic analyzers or by the fast Fourier transform processor comprising it, is used to determine at least the velocity of each separately resolvable target 22 within field of view 24 of velocimeter and tracker 10, as described below.

Modulation of Coherent Light to Determine Range

Figure 3:
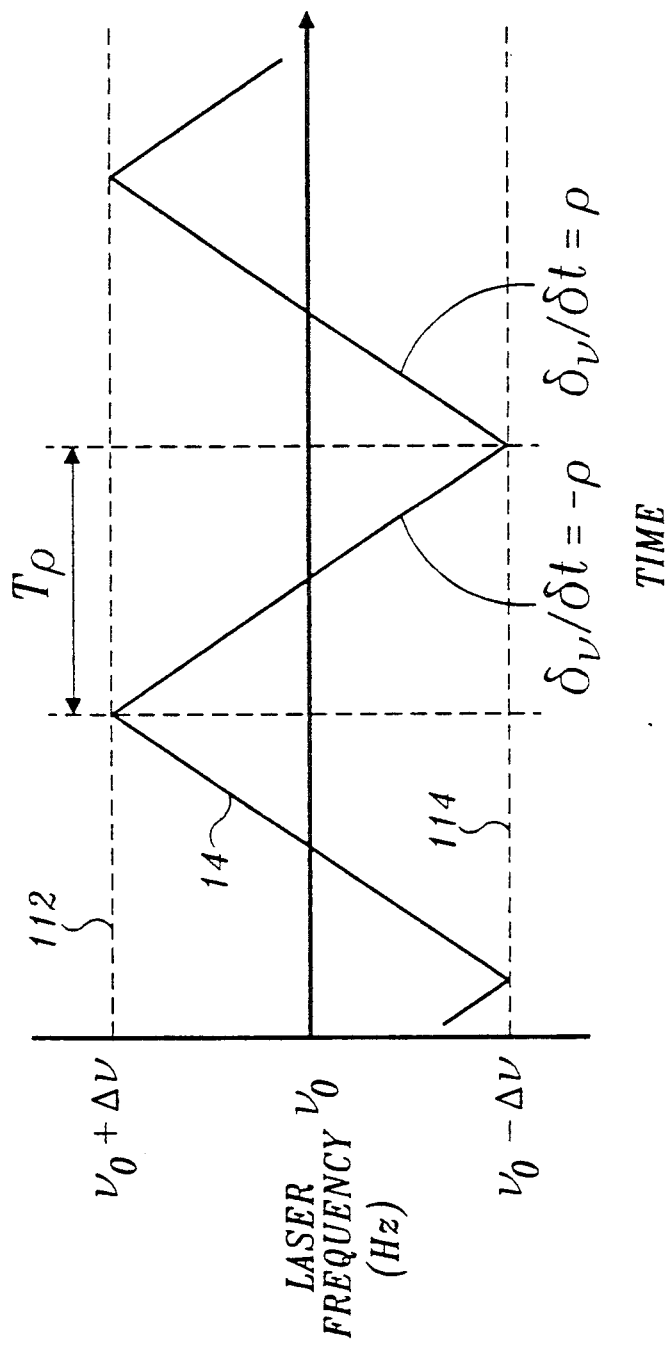
FIG. 3 is a graph illustrating the periodic frequency modulation over time (or "chirping") of the coherent light used in the present invention.

In certain applications of velocimeter and tracker 10, it may also be necessary to determine the range of each target. In this case, the coherent light produced by laser 12 is frequency modulated by $\pm \Delta \nu$ around its baseline frequency, $\nu_0$, as shown in FIG. 3. Frequency modulation of the coherent light produced by laser 12, which is sometimes referred to as up- and down-chirping, causes the frequency of the coherent light to increase linearly from a minimum frequency ($\nu_0 - \Delta\nu$) as represented at dashed line 114, to a maximum frequency ($\nu_0 + \Delta\nu$), as represented by dashed line 112 in FIG. 3. This up- and down-chirping of the frequency occurs periodically during each pulse of light produced by laser 12, with a period equal to $2T_p$. The rate of change of the frequency of coherent light produced by laser 12 is equal to $\delta\nu/\delta t = \rho$ when the frequency is increasing from the minimum to the maximum value and is equal to $-\rho$ when the frequency is decreasing. For proper operation, two constraints must be met: $T_p \geq 8r(t)/c$, where r(t) is the range of the target, and $\Delta\nu/\nu_0 \ll 1$. Those of ordinary skill in the art will appreciate that the frequency modulation of laser 12 as required to achieve these constraints can be accomplished in a number of ways. However, in the preferred embodiment, laser 12 is frequency modulated by optically or mechanically modulating the length of its optical cavity (not separately shown) in which the coherent light is produced. For example, if the basic frequency, $\nu_0$, of laser 12 corresponds to a wavelength of 10.6 microns, a 0.001-inch change in the length of a 36-inch-long cavity produces a shift of approximately 800 MHz in the laser frequency. Appropriate lasers provided with means for controllably modulating the coherent light they produce are readily available commercially.

Determination of Range and Velocity of One or More Targets

Figure 4:
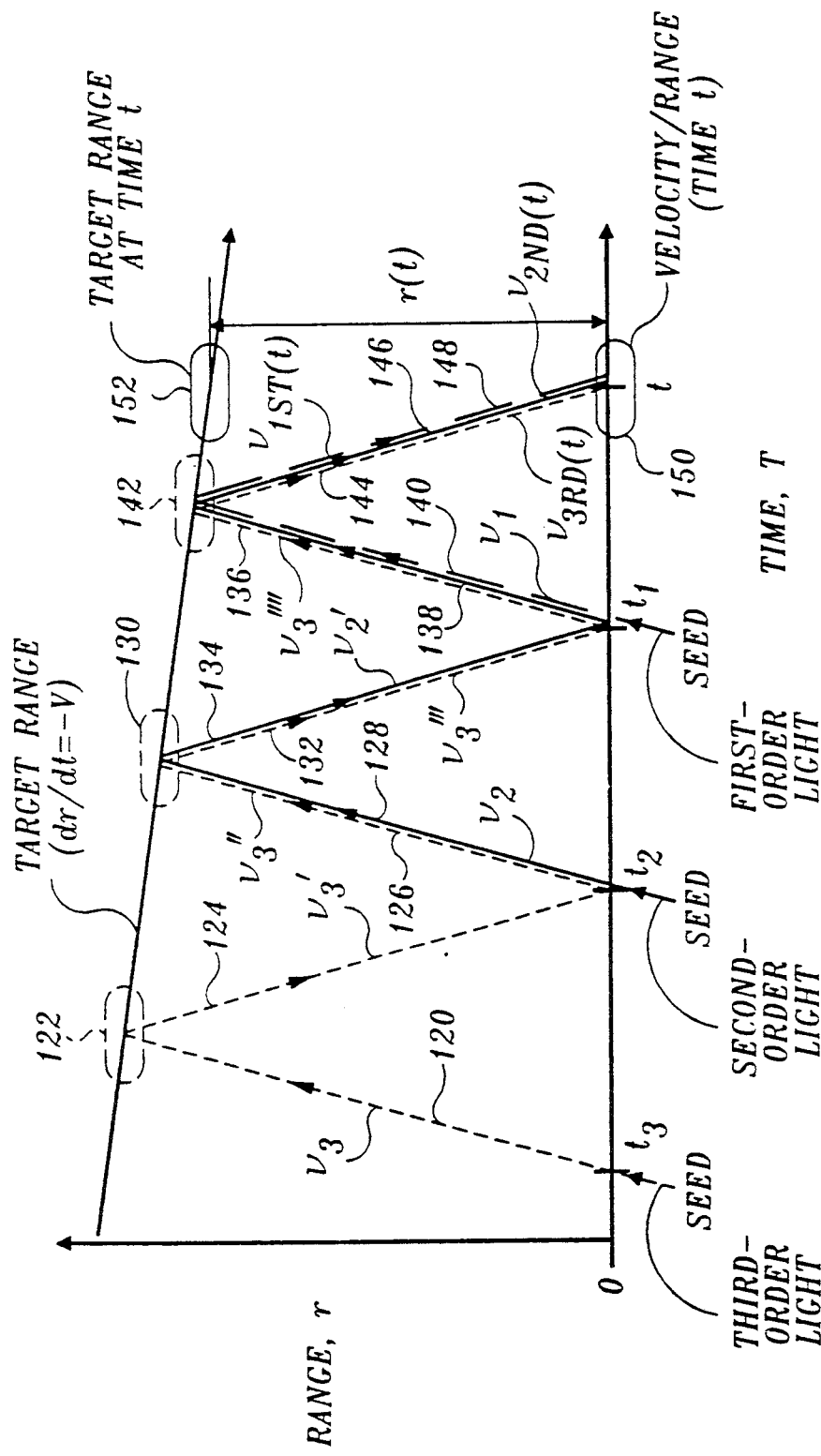
FIG. 4 is a schematic graphical representation of the first, second, and third order light waves reflected from a target over time, which are used to determine the target's range based on the frequencies of those light waves.

Referring to FIG. 4, the range of a single target 22a is plotted in respect to time to illustrate how first order, second order, and third order light signals are reflected from the target at times during one laser pulse, to determine the range and line-of-sight velocity of the target in respect to velocimeter and tracker 10. It should be noted that the target's range is changing in time, which correspond to $dr/dt = -V$, i.e., the target has a closing line-of-sight velocity $-V$. The range line in FIG. 4 does not represent a track followed by the target from left to right. The total time displayed in FIG. 4, starting at $t_3$ and ending at t, corresponds to less than the time for one pulse emitted by laser 12.

The velocity and range of target 22a are determined at time t based on the frequency of a first order light signal 148 (represented by $\nu_{1st(t)}$), the frequency of a second order light signal 146 ($\nu_{2nd(t)}$), and a frequency of a third order light signal 144 ($\nu_{3rd(t)}$) arriving at velocimeter and tracker 10 at time t, which is indicated generally at 150 in FIG. 4. At time t, the target's range r(t) is indicated generally at 152.

The first order light signal 148 was initially emitted as a seed wave 140 by laser 12 at time $t_1$, defined as:

$$t_1 = t - [4/(2-b)][r(t)/c] \tag{1a}$$

At time $t_1$, the frequency, $\nu_1$, of the seed wave is defined by:

$$v_1 = v(t) - [4/(2-b)][p_r(t)/c] \quad (1b)$$

In these equations, $v(t)$ is the frequency of the modulated coherent light signal emitted by laser 12 at time t, b is the Doppler shift parameter $2V/c$, and c is the speed of light. All other variables are as previously defined.

Upon striking target 22a when it is at the range indicated generally at 142, the first order light signal comprising seed wave 140 undergoes a Doppler shift in frequency due to the target's line-of-sight velocity in respect to velocimeter and tracker 10 ($dr/dt = -V$). Thus, when first order light signal 148 arrives at velocimeter and tracker 10 at time t, its optical frequency $v_{1st(t)} = (1+b)v_1$ or:

$$v_{1st(t)} = (1+b)v(t) - [4(1+b)/(2-b)][p_r(t)/c] \quad (2)$$

The second order light arriving at velocimeter and tracker 10 at time t is emitted by laser 12 as a seed wave 128 at time $t_2$, defined as:

$$t_2 = t - [16/(2-b)^2][r(t)/c] \quad (3a)$$

At time $t_2$, the frequency of the coherent light is $v_2 = v(t_2)$, as given by:

$$v_2 = v(t) - [16/(2-b)^2][p_r(t)/c] \quad (3b)$$

The second order light emitted at time $t_2$ and comprising seed wave 128 strikes the target when the target's range is generally at 130. The frequency of the second order light is Doppler-shifted due to the velocity V of the target. A Doppler-shifted second order light signal 134 reflected from target 22 thus has a frequency $v_2' = (1+b)v_2$, or:

$$v_2' = (1+b)v(t) - [16(1+b)/(2-b)^2][p_r(t)/c] \quad (4)$$

When the Doppler-shifted second order light signal 134 (at frequency $v_2'$) arrives at PCM 40 at time $t_1$, the frequency of pump waves 54 and 60 is $v_1$, as defined in Equation (1b). As a result, a phase conjugate wave 138 is produced by PCM 40 due to the mixing of the second order light signal 134 and pump waves 54 and 60 that has a frequency $v_2'' = 2v_1 - v_2'$, or:

$$v_2'' = (1-b)v(t) = [24b/(2-b)^2][p_r(t)/c] \quad (5)$$

Phase conjugate wave 138 of the second order light strikes target 22a at range 142, and the frequency of the reflected light is again Doppler-shifted due to the velocity, V, of the target, the reflected light is the second order light signal 146, represented by $v_{2nd}(t) = (1+b)v_2''$, or:

$$v_{2nd}(t) = (1-b^2)v(t) + [24b(1+b)/(2-b)^2][p_r(t)/c] \quad (6)$$

Third order light is emitted as a seed wave 120 by laser 12 at time $t_3$, where:

$$t_3 = t - [4(12+b^2)/(2-b)^3][r(t)/c] \quad (7a)$$

At time $t_3$, seed wave 120 has a frequency $v_3 = v(t_3)$, given by:

$$v_3 = v(t) - [4(12+b^2)/(2-b)^3][p_r(t)/c] \quad (7b)$$

When the third order light signal comprising seed wave 120 strikes target 22 at the time the target is generally at a range 122, the frequency of third order light is Doppler-shifted due to the velocity, V, of the target, so that a Doppler-shifted light signal 124 has a frequency $v_3' = (1+b)v_3$, or:

$$v_3' = (1+b)v(t) - [4(1+b)(12+b^2)/(2-b)^3][p_r(t)/c] \quad (8)$$

Doppler-shifted light signal 124 enters PCM 40 at time $t_2$ and mixes with pump waves 54 and 60 when their frequency is $v_2$. A phase conjugate wave 126 is thus produced by PCM 40 at time $t_2$, and it has a frequency $v_3'' = 2v_2 - v_3'$, or:

$$v_3'' = (1-b)v(t) - [4(4-20b-b^2-b^3)/(2-b)^3][p_r(t)/c] \quad (9)$$

A Doppler-shifted, phase conjugate third order light signal 132 is reflected from the target when it is at range 130, due to the Doppler shift it incurs, the frequency of light signal 132 is $v_3''' = (1+b)v_3'$, or:

$$v_3''' = (1-b^2)v(t) - [4(1+b)(4-20b-b^2-b^3)/(2-b)^3][p_r(t)/c] \quad (10)$$

When Doppler-shifted, phase conjugate third order light signal 132 (at frequency $v_3'''$) arrives at PCM 40 at time $t_1$, pump waves 54 and 60 have a frequency $v_1$. A phase conjugate light signal 136 is formed by the combination of the third order light and the pump waves and it has a frequency $v_3'''' = 2v_1 - v_3'''$, or:

$$v_3'''' = (1+b^2)v(t) - [4(4+8b+23b^2+2b^3+b^4)/(2-b)^3][p_r(t)/c] \quad (11)$$

Finally, the frequency of phase conjugate light signal 136 is again Doppler-shifted by reflection from target 22a when the target's range is at 142, so that third order light signal 144 is produced, and its frequency is defined by $v_{3rd}(t) = (1+b)v_3''''$, or:

$$v_{3rd}(t) = (1+b+b^2+b^3)v(t) - [4(4+12b+31b^2+25b^3+3b^4+b^5)/(2-b)^3][p_r(t)/c] \quad (12)$$

The first, second, and third order light signals 148, 146, and 144 traveling toward velocimeter and tracker 10 all arrive at time t. Photodiode 68b on which these light signals are all incident produces an electrical current signal corresponding to the optical signal power of the combined first, second, and third order light signals striking the photodiode. The total power, $P_s$, of these optical signals is given by the following equation:

$$P_s = PK_0R_0 + PK_0R_0(1-R_0)^2RK_1 + PK_0R_0(1-R_0)^4R^2K_1^2 \quad (13)$$

where the three terms on the right side of Equation (13) respectively represent the contributions of the first, second, and third order light signals, $v_{1st}(t)$, $v_{2nd}(t)$, and $v_{3rd}(t)$, as given by Equations (2), (6), and (12).

Thus, the electrical current signal produced by photodiode 68b due to the light signals incident thereon from imaging target 22a includes the following components (ignoring phasal relationships between non-DC components of the signal):

$$i_{DC} = -(Qe/hv_0)PK_0R_0\{1+(1-R_0)^2RK_1+(1-R_0)^4R^2K_1^2\} \quad (14a)$$

$$i_{S1} = 2(Qe/hv_0)PK_0R_0(1-R_0)R^{\frac{1}{2}}K_1^{\frac{1}{2}}\cos(f_{S1}t) \quad (14b)$$

$$i_{S2} = 2(Qe/hv_0)PK_0R_0(1-R_0)^2RK_1\cos(f_{S2}t) \quad (14c)$$

$$i_{S3} = 2(Qe/hv_0)PK_0R_0(1-R_0)^3R^{3/2}K_1^{3/2}\cos(f_{S3}t) \quad (14d)$$

where $i_{DC}$ is the direct current (DC) component, $i_{S1}$ is the component due to the first and second order light signals, $i_{S2}$ is the component due to the first and third order light signals, $i_{S3}$ is the component due to the second and third order light signals, Q is a quantum efficiency characteristic of the photodiode, h is Planck's constant, and e is the charge on an electron. The frequency, $f_{S1}$, for the first order electrical signal current, $i_{S1}$, is $f_{S1} = v_{1st}(t) - v_{2nd}(t)$, or:

$$f_{S1} = (b+b^2)v_0 - [4(2+7b+5b^2)/(2-b)^2][\rho r(t)/c] \quad (15)$$

based on substituting $v_0$ for $v(t)$, since $v(t)$ is approximately equal to $v_0$.

Similarly, the frequency of the second order electrical current $i_{S2}$ is given by $f_{S2} = v_{3rd}(t) - v_{1st}(t)$, or:

$$f_{S2} = (b^2+b^3)v_0 - [4b(12+34b+24b^2+3b^3+b^4)/(2-b)^3][\rho r(t)/c] \quad (16)$$

Finally, the frequency of the third order electrical signal current, $i_{S3}$, is given by $f_{S3} = v_{3rd}(t) - v_{2nd}(t)$, or:

$$f_{S3} = (b+2b^2+b^3)v_0 - [4(4+24b+37b^2+19b^3+3b^4+b^5)/(2-b)^3][\rho r(t)/c] \quad (17)$$

In determining the velocity and range for target 22, the frequencies of the first, second, and third order electrical signals defined in Equations (15), (16), and (17) must be determined during both an up-chirp portion of the modulated coherent light pulse produced by laser 12 and a down-chirp portion. The frequencies of the electrical currents produced by photodiodes 68 corresponding to the various orders of light signals incident on the photodiodes are identified with a "+" superscript if determined when the coherent light is undergoing an up-chirp modulation (slope $\rho$) and a "−" superscript when the coherent light is undergoing a down-chirp modulation (slope $-\rho$). To simplify the derivations of velocity and range based upon the frequencies of the various orders of electrical current produced by photodiodes 68 in detector array 36, the calculations presume that the Doppler shift parameter is $b = 2V/c \ll 1$. As a result, second order and higher order terms of b can generally be ignored due to their relatively low magnitudes.

Range and velocity information can be determined solely from $f_{S1}^+$ and $f_{S1}^-$, which are referred to herein as a Doppler pair, or solely from $f_{S2}^+$ and $f_{S2}^-$, which are referred to herein as a hyper-Doppler pair. Preferably, the Doppler pair are used, since they comprise stronger signals than the hyper-Doppler pair. However, if the line-of-sight velocity, V, of the target in respect to velocimeter and tracker 10 is sufficiently high, the frequencies of the Doppler pair can become unmanageably large, i.e., difficult to determine accurately using conventional signal processing equipment. In this case, it is more desirable to determine the range and line-of-sight velocity of the target from the hyper-Doppler pair, since the frequencies of this pair are much lower than the Doppler pair.

In determining the velocity and range from the Doppler pair, the expressions for $f_{S1}^+$ and $f_{S1}^-$ simplify to an average value:

$$(f_{S1}^+ + f_{S1}^-)/2 = (b+b^2)v_0 \quad (18)$$

where terms including $\rho$ in Equation (15) cancel because of the opposite sign of $\rho$ that applies to each component of the Doppler pair. Ignoring the relatively small second order term $b^2$, a value for b is obtained:

$$b = (f_{S1}^+ + f_{S1}^-)/2v_0 \quad (19)$$

and a value for the line-of-sight velocity of target 22a in respect to velocimeter and tracker 10 is given by:

$$V = (f_{S1}^+ + f_{S1}^-)c/(4v_0) \quad (20)$$

The estimate for the target's range is obtained from the difference between $f_{S1}^+$ and $f_{S1}^-$ as follows:

$$f_{S1}^- - f_{S1}^+ = [8(2+7b+5b^2)/(2-b)^2][\rho r(t)/c] = 4\rho r(t)/c \quad (21)$$

which yields an estimate for target range:

$$r(t) = (f_{S1}^- - f_{S1}^+)c/(4\rho) \quad (22)$$

If the frequencies of the Doppler pair become too great for practical measurement on available instrumentation, an estimate for target velocity can be obtained from the average of the hyper-Doppler pair as follows:

$$(f_{S2}^+ + f_{S2}^-)/2 = (b^2+b^3)v_0 \quad (23)$$

Ignoring the term $b^3$, a value for the Doppler shift is obtained:

$$b = (f_{S2}^+ + f_{S2}^-)^{\frac{1}{2}}/(2v_0)^{\frac{1}{2}} \quad (24)$$

resulting in a velocity estimate of:

$$V = (f_{S2}^+ + f_{S2}^-)^{\frac{1}{2}}c/(8v_0)^{\frac{1}{2}} \quad (25)$$

Similarly, target range can be obtained from this velocity estimate and the difference between the hyper-Doppler pair as follows:

$$\begin{aligned}f_{S2}^- - f_{S2}^+ &= [8b(12+34b+24b^2+3b^3+b^4)/(2-b)^3][\rho r(t)/c] \\ &= 12b\rho r(t)/c \\ &= 24V\rho r(t)/c^2\end{aligned} \quad (26)$$

yielding an estimate for target range:

$$r(t) = (f_{S2}^- - f_{S2}^+)c^2/(24V\rho) \quad (27)$$

which reduces to:

$$r(t) = (f_{S2}^- - f_{S2}^+)(f_{S2}^+ + f_{S2}^-)^{-\frac{1}{2}}(2v_0)^{\frac{1}{2}}c/(12\rho) \quad (28)$$

The same velocity and range information can, in principle, be determined from the third order hyper-velocity pair $f_{S3}^+$ and $f_{S3}^-$, but since these signals are very close to the same frequency as the Doppler pair and are significantly weaker than the Doppler pair signals, there is little advantage in using these signals. Also, range and line-of-sight velocity of target 22b (and all other targets) are determined in an analogous manner using the Doppler pair or hyper-Doppler pair associated with the signals produced by any photodiode 68 on which an image of the target in question is incident.

In the event that range information is not required for any target, laser 12 need not be modulated and can simply provide a fixed-frequency coherent light signal (at frequency $\nu_0$); $\rho$ is then equal to zero in the preceding equations. In this case, estimates of the velocity are obtained from the Doppler pair, using Equation (20), or from the hyper-Doppler pair, using Equation (25), wherein $2f_{S1}$ is substituted for $(f_{S1}{}^+ + f_{S1}{}^-)$, and $2f_{S2}$ is substituted for $(f_{S2}{}^+ + f_{S2}{}^-)$, respectively.

Second Embodiment of Velocimeter and Tracker

Figure 2:
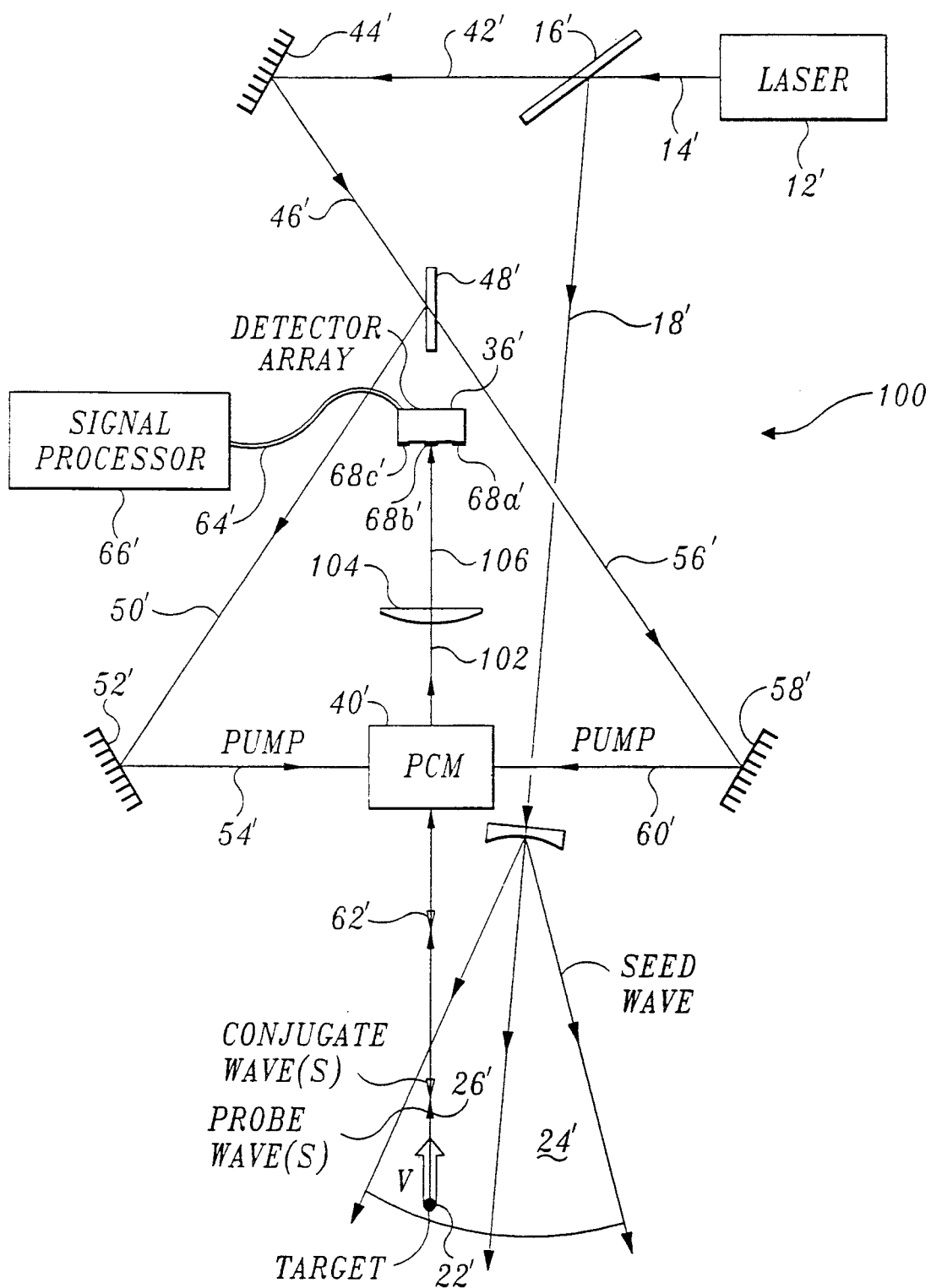
FIG. 2 is a schematic plan view of a second embodiment of the optical phase conjugate velocimeter.

FIG. 2 illustrates a second embodiment of a velocimeter and tracker 100. Most of the elements comprising velocimeter and tracker 100 are the same as in the first embodiment and, to the extent that they carry out the same function and are generally of the same configuration, are identified in FIG. 2 using the same reference numeral, but with a prime notation. For example, a laser 12' produces coherent light in velocimeter and tracker 100, generally carrying out the same function as laser 12 in respect to velocimeter and tracker 10. However, in velocimeter and tracker 100, the seed wave and other light signals reflected from target 22' toward a PCM 40' are not partially reflected by a beam splitter, as in the first embodiment. Instead, all of the light signals reflected from target 22' along the detection path directly enter PCM 40'. A portion of the light signals passes through the phase conjugate mirror along a path 102 that is directed toward a lens 104, which is on the opposite side of the phase conjugate mirror from target 22'. Lens 104 images the light traveling along path 102 onto a detector array 36', which includes a plurality of photodiodes 68'. The frequency of the first, second, and third order light signals reflected from target 22' is Doppler-shifted due to the relative line-of-sight velocity of the target in respect to velocimeter and tracker 100. These light signals each produce a corresponding electrical signal at each of photodiodes 68' on which a target image is incident. The electrical signal produced by each photodiode 68' is supplied through cable 64' to a signal processor 66'.

Target 22' has a line-of-sight velocity, V, in respect to velocimeter and tracker 100. When illuminated with coherent light comprising a seed wave as it passes through field of view 24', the target reflects a small fraction, $K_0$, of the seed wave power back toward PCM 40', where it is amplified by a factor $(1+R)$ and passed on toward imaging lens 104. Lens 104 images the light signal on detector array 36'. The optical power of this first order signal at a photodiode 68b' is $P_1 = PK_0(1+R)$, and at the phase conjugate mirror is $P_{1pcm} = PK_0$. Due to the relative line-of-sight velocity of target 22', the first order light signal is Doppler-shifted by the factor b. In PCM 40', a phase conjugate wave is generated in response to the first order light signal, but is phase-shifted due to frequency inversion as a result of the optical phase conjugation process. The phase conjugate wave returns precisely to target 22' because of the time-reversed propagation property of phase conjugate waves. A fraction, $K_1$, of this light is reflected from target 22' and its frequency is again Doppler-shifted because of the target's relative line-of-sight velocity. This reflected light, representing a second order light signal, returns to PCM 40', where it is amplified and transmitted onto photodiode 68b'. The optical power of the second order light signal at the detector array is $P_2 = PK_0(1+R)RK_1$, and at the phase conjugate mirror is $P_{2pcm} = PK_0RK_1$. A third order light signal is produced from a further reflection by target 22', and its power at detector array 36' is given by $P_3 = PK_0(1+R)R^2K_1^2$ and at the phase conjugate mirror, is given by $P_{2pcm} = PK_0R^2K_1^2$. The frequencies of the first, second, and third order optical signals for velocimeter and tracker 100 are the same as the corresponding frequencies in respect to the first embodiment, velocimeter and tracker 10. Proper operation of velocimeter and tracker 100 also requires that the effective aperture of the phase conjugate mirror and of the target be a mutually unresolvable pair.

At detector array 36', the total power of the first, second, and third order light signals of an imaged target incident on a photodiode is as follows:

$$P_s = PK_0(1+R) + PK_0(1+R)RK_1 + PK_0(1+R)R^2K_1^2 \quad (29)$$

where the successive terms on the right side of Equation (29) respectively correspond to the relative contributions of the first, second, and third order optical light signals. In accordance with the square law detector response of photodiodes 68', the following corresponding electrical current signals are produced by the photodiode:

$$i_{DC} = (Qe/h\nu_0)PK_0(1+R)\{1 + RK_1 + R^2K_1^2\} \quad (30a)$$

$$i_{S1} = 2(Qe/h\nu_0)PK_0(1+R)R^{\frac{1}{2}}K_1^{\frac{1}{2}}\cos(f_{S1}t) \quad (30b)$$

$$i_{S2} = 2(Qe/h\nu_0)PK_0(1+R)RK_1\cos(f_{S2}t) \quad (30c)$$

$$i_{S3} = 2(Qe/h\nu_0)PK_0(1+R)R^{3/2}K_1^{3/2}\cos(f_{S3}t) \quad (30d)$$

The line-of-sight velocity and range of target 22' are determined by velocimeter and tracker 100 as already explained above, in respect to velocimeter and tracker 10, based upon the frequencies of the Doppler pair and/or the hyper-Doppler pair that are measured during the up-chirp and down-chirp modulation of the coherent light produced by laser 12'. The same equations developed above for determining range and line-of-sight velocity in respect to the first embodiment also apply to the second embodiment.

Figure 5:
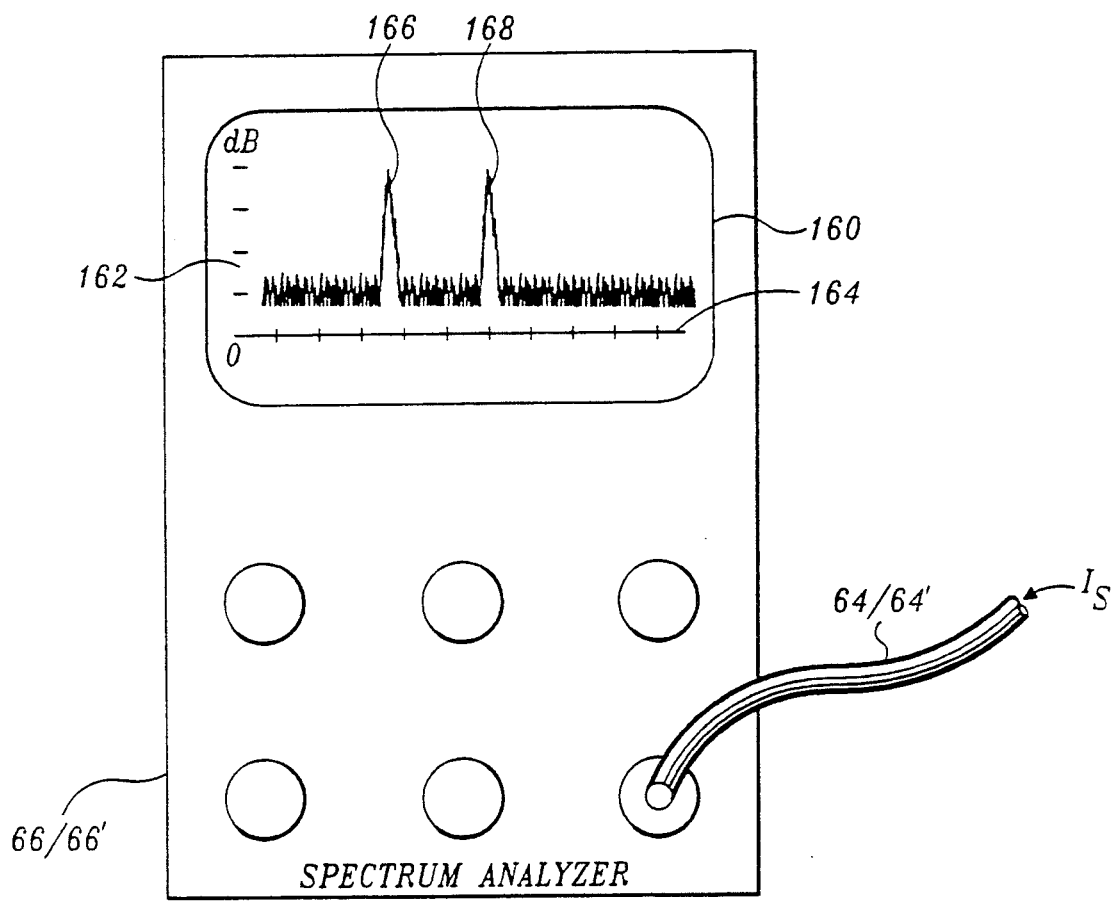
FIG. 5 illustrates a display on a spectrographic analyzer of frequency/amplitude data, which are used to determine the range and velocity of a target in the present invention.

Turning now to FIG. 5, a spectrum analyzer comprising signal processor 66/66' is used for monitoring the electrical current signals produced by one of the photodiodes 68/68' in detector array 36/36'. This spectrum analyzer produces a graphic display of the frequency domain of the electrical current signals. In the frequency domain, an amplitude 162 of each frequency 164 comprising these signals are displayed on a cathode ray tube display 160 so that relatively sharp frequency peaks 166 and 168 are evident. For example, frequency peak 168 corresponds to the $f_{S1}{}^+$ component and frequency peak 166 corresponds to the $f_{S1}{}^-$ component of the Doppler pair. Alternatively, peaks 168 and 166 on cathode ray tube 160 may represent the hyper-Doppler pair, which are useful for determining the velocity and range of targets 22/22' if the velocities are too great to readily monitor the resulting Doppler pair frequencies. An operator can readily read the frequencies corresponding to frequency peaks 166 and 168 from cathode ray tube 160 to determine a target's range and velocity, or alternatively, this information can be determined by a central processing unit (not separately shown) within signal processor 66/66', which is programmed to carry out fast Fourier transform of the signal and to determine velocity and range in accordance with the equations set forth above.

Factors Affecting the Performance of Velocimeter and Tracker

In both embodiments of the velocimeter and tracker in accordance with present invention, a critical parameter affecting performance is the "reflectivity," R, of the phase conjugate mirror. Those of ordinary skill in this art will understand that PCM 40/40' does not actually reflect the incident probe wave, but instead combines the probe wave with the pump waves to generate the conjugate wave and simultaneously amplifies the probe wave. Assuming that the power in the probe wave is $P_p$, the power in the resulting conjugate wave is $RP_p$ and the power of the probe wave that is transmitted through the phase conjugate mirror (used in velocimeter and tracker 100) is $(1+R)P_p$. In the preferred embodiments explained above, equal pump wave intensities $I_1$ and $I_2$ are directed toward the phase conjugate mirror from opposite directions, and its reflectivity, R, is given by:

$$R = \{(6\nu_0\mu_0/n^2\epsilon_0)LX(3)_{xxxx}\}^2 I_2 I_2 \quad (31)$$

where $\mu_0$ is the permeability of free space, $\epsilon_0$ is the permitivity of free space, and n is a linear index of refraction for the medium comprising the phase conjugate mirror. In this equation, L represents the length over which the probe wave interacts along its normal direction of propagation with the pump waves, which are transversely incident, and $X(3)_{xxxx}$ is a particular element of the third order non-linear optical susceptibility tensor for the medium comprising the phase conjugate mirror. Clearly, enhanced performance is provided by selecting a medium for the phase conjugate mirror and a laser wavelength for which $X(3)_{xxxx}$ is as large as possible.

In the preferred embodiment, germanium is selected for the medium in the phase conjugate mirror and has a third order non-linear optical susceptibility tensor $X(3)_{xxxx} = 1 \times 10^{-29}$ (SI units), and an index of refraction $n=4$. Accordingly, the value of R is $2.27 \times 10^{-22} L^2 I_1 I_2$. For a laser 12/12' having a peak power of 100 kilowatts and for pump waves 54 and 60 that are focused to approximately 1 mm diameter, the probe wave interacts with the pump waves over a distance $L \simeq 1$ cm within the germanium medium, so that the resulting reflectivity, $R = 3.7 \times 10^{-4}$. Preferably, seed wave power and efficiency, P and $K_0$, are selected so that shot noise due to DC current associated with the first order light signal dominates all other noise sources in the detector. To achieve this result, approximately 1 milliwatt of optical power is required in the first order light signal. The signal-to-noise ratios (SNRs) of the electrical signal currents $i_{S1}$ and $i_{S2}$ produced by first order light signals of this power are given by:

$$SNR_{S1} = Q(PK_0R_0)(1-R_0)^2 RK_1/(h\nu_0 B) \quad (32a)$$

$$SNR_{S2} = Q(PK_0R_0)(1-R_0)^4 R^2 K_1^2/(h\nu_0 B) \quad (32b)$$

where B is the detection bandwidth (100 KHz for a 10-microsecond pulse of coherent light). Assuming that $R_0 = 0.5$ that $K_1 = 0.1$, that $Q = 1$, and that the first order light signal optical power is approximately 1 milliwatt, the signal-to-noise ratios for the preferred embodiments are approximately 67 dB for $SNR_{S1}$ and 17 dB for $SNR_{S2}$, with respect to velocimeter and tracker 10. Similarly, given the same assumptions, the signal-to-noise ratios for the second embodiment are 73 dB for $SNR_{S1}$ and 28 dB for $SNR_{S2}$. It will thus be apparent that both embodiments have good signal-to-noise ratios and can readily be used in determining the line-of-sight velocity and range of a target or targets in respect to either the Doppler or hyper-Doppler frequency signals associated with $i_{S1}$ and $i_{S2}$, respectively.

While the present invention has been disclosed in respect to its preferred embodiments, those of ordinary skill in the art will appreciate that modifications thereto may be made within the scope of the claims that follow. Accordingly, it is not intended that the Description of the Preferred Embodiments in any way limit the scope of the invention, which instead should be defined entirely by reference to the claims.

The invention in which an exclusive property or privilege is claimed is defined as follows:

1. Apparatus for tracking a light-reflective target to determine its velocity and/or position, comprising:
    (a) a source of coherent light having a frequency, $\nu_0$, a portion of the coherent light from the source being directed generally toward the light-reflective target, illuminating it so that it reflects at least some of the coherent light along a detection path as a first order light signal, a frequency of the coherent light comprising the first order light signal being changed by a Doppler shift, $\nu_0 b$, due to a component of the velocity of the target along the detection path;
    (b) optical phase conjugate means, disposed along the detection path so as to receive the first order light signal, for producing a first optical phase conjugate wave in respect to the first order light signal, the first optical phase conjugate wave having a frequency that is shifted from $\nu_0$ by $-\nu_0 b$ and returning to the light-reflective target in the opposite direction along the detection path, at least a portion of the first optical phase conjugate wave being reflected by the light-reflective target back along the detection path toward the optical phase conjugate means and experiencing a total Doppler shift in frequency of $-\nu_0 b^2$ due to the component of the velocity of the target along the detection path, this portion of the first optical phase conjugate wave being thus a second order light signal;
    (c) imaging means, disposed so as to receive at least a portion of the second order light signal and at least a portion of the first order light signal that is reflected from the light-reflective target, for detecting and monitoring a spatially dependent intensity of such portions, producing an electrical signal indicative of a combination of said light signals for use in determining the position of the light-reflective target; and
    (d) signal processing means for monitoring the frequency of the electrical signal, which results from the detection of the combination of the first and the second order light signals, to determine the component of the velocity of the target along the detection path.

2. The apparatus of claim 1, wherein the imaging means determine an azimuth and an altitude of the light-reflective target to determine its position.

3. The apparatus of claim 1, further comprising splitter means for splitting light emitted from the source of coherent light, producing a first pump wave and a second pump wave, and means for directing the first and second pump waves toward the optical phase conjugate means from generally opposite directions.

4. The apparatus of claim 1, wherein the imaging means comprise an array of light-sensitive devices, each of which produce a signal corresponding to the intensity of light reflected from the light-reflective target that is incident on the light-sensitive devices, a relative position of a light-sensitive device in the array determining the position of the target if the signal from that light-sensitive device is substantially greater than an average signal for all of the light-sensitive devices.

5. The apparatus of claim 1, wherein the phase conjugate means are further operative to produce a second optical phase conjugate wave from the second order light signal, the second optical phase conjugate wave having a frequency, $\nu_0(1+b^2)$, and traveling back toward the light-reflective target along the detection path, at least a portion of the second optical phase conjugate wave being reflected from the light-reflective target, thereby experiencing a further Doppler shift, a frequency of the portion of the second optical phase conjugate wave thus reflected becoming $\nu_0(1+b+b^2+b^3)$, whereby that portion becomes a third order light signal, at least a portion of the third order light signal and the first order light signal being detected by the imaging means to further define the velocity of the light-reflective target along the detection path.

6. The apparatus of claim 1, wherein a plurality of light-reflective targets is illuminated by coherent light from the source, the phase conjugate means being operative to produce a plurality of phase conjugate waves, each corresponding to a different probe wave that is reflected from each light-reflective target.

7. The apparatus of claim 6, wherein the imaging means and signal processing means track and determine the velocity of each of the plurality of light-reflective targets, as a function of the frequency of the phase conjugate waves reflected from each light-reflective target.

8. The apparatus of claim 1, further comprising means for focusing portions of the light comprising the first, second, and third order light signals onto an image plane for detection by the imaging means.

9. The apparatus of claim 1, further comprising means for periodically modulating a frequency of the coherent light emitted by the source over time, the signal processing means responding to the intensities of the first, second, and third order light signals received by the imaging means to produce a signal having a plurality of frequency components, each frequency component corresponding to the frequency difference between two of these light signals, and based on this signal, determining the range of the light-reflective target.

10. The apparatus of claim 1, further comprising means for periodically modulating the frequency $\nu_0$ of the coherent light emitted by the source over time so that the frequency alternately increases and decreases the imaging means responding to the intensities of the first, second, and third order light signals received by the imaging means to produce a signal having a plurality of frequency components to which the signal processing means responds, each frequency component corresponding to the frequency difference between two of these light signals as determined by the signal processing means, the range of the light-reflective target being determined based on a difference in frequency of one of the frequency components determined when the frequency of the coherent light is increasing and then, when it is decreasing during the modulation of the coherent light.

11. A method for determining the velocity of a light-reflective target comprising the steps of:
(a) illuminating the light-reflective target with coherent light;
(b) using light reflected from the light-reflective target and propagating along a detection path as a first order light signal, producing an optical phase conjugate wave directed back along the detection path toward the light-reflective target, a portion of the optical phase conjugate wave being reflected from the light-reflective target comprising a second order light signal;
(c) imaging a portion of the second order light signal reflected from the light-reflective target, producing a signal that is frequency-shifted as a function of a component of the velocity of the light-reflective target along the detection path; and
(d) determining the component of the velocity of the light-reflective target directed along the detection path from a frequency of the signal, where the frequencies of the first order light signal and the second order light signal reflected from the light-reflective target are Doppler-shifted due to the component of the velocity of the light-reflective target directed along the detection path.

12. The method of claim 11, wherein the step of producing the optical phase conjugate wave includes the steps of splitting the coherent light into two pump waves and directing the pump waves to intersect an optical phase conjugate mirror disposed in the detection path, from opposite directions.

13. The method of claim 11, wherein the step of imaging comprises the step of determining a position of the light-reflective target based on a spatial position of light reflected from it on a detector surface.

14. The method of claim 13, further comprising the step of producing a second optical phase conjugate wave from the second order light signal that is reflected from the light-reflective target, the second optical phase conjugate wave traveling back toward the light-reflective target and being reflected therefrom along the detection path to form a third order light signal.

15. The method of claim 14, further comprising the step of imaging the third order light signal, the frequency of the frequency modulated intensity resulting from a combination of the first and the third order light signals being proportional to the square of the component of the velocity of the light-reflective target directed along the detection path.

16. The method of claim 15, further comprising the steps of illuminating a plurality of light-reflective targets with coherent light from a laser; and producing a phase conjugate wave corresponding to a first order light signal reflected from each of the light-reflective targets that propagates along a corresponding detection path for that light-reflective target, the frequencies of the phase conjugate waves reflected from each light-reflective target being Doppler-shifted due to the component of the velocity of that target directed along the detection path for that light-reflective target.

17. The method of claim 16, wherein the step of imaging includes the step of imaging the phase conjugate waves reflected from each of the plurality of targets over time, so as to track the components of velocity directed along the detection path and the position of each such target.

18. The method of claim 11, further comprising the steps of modulating the frequency of the coherent light so that the signal produced by imaging includes a plurality of frequency components determined at different times, including a time when the frequency of the coherent light is increasing and a time when it is decreasing, and determining the range of the target as a function of a difference in frequency of two of the frequency components at the different times during the modulation.

19. The method of claim 17, further comprising the steps of modulating the frequency of the coherent light so that the signal produced by imaging includes a plurality of frequency components determined at different times, including a time when the frequency of the coherent light is increasing and a time when it is decreasing, and determining the range of the targets as a function of a difference in frequency of two of the frequency components at the different times during the modulation.

20. The method of claim 19, wherein one of two frequency components results from a combination of the second and the first order light signals, or alternatively, from a combination of the third and the first order light signals produced when the frequency of the coherent light is increasing and the other of the two frequency components results from the same combination of said light signals produced when the frequency of the coherent light is decreasing.

* * * * *